United States Patent [19]
Fleming

[11] 4,105,221
[45] Aug. 8, 1978

[54] TENSIONING LINKAGE

[76] Inventor: Ancel H. Fleming, 3715 N. Tulsa, Oklahoma City, Okla. 73112

[21] Appl. No.: 765,533

[22] Filed: Feb. 4, 1977

[51] Int. Cl.² .............................................. B60D 1/00
[52] U.S. Cl. ................................ 280/461 A; 172/450; 403/43
[58] Field of Search ..................................... 403/43–48; 24/129 R, 68 CT, 73 A; 151/43; 280/457, 458, 480, 461 A, 460 A, 456 A; 172/450; 29/175 R

[56] References Cited
U.S. PATENT DOCUMENTS

| | | | |
|---|---|---|---|
| 609,325 | 8/1898 | Boasso | 151/43 |
| 985,269 | 2/1911 | MacIntyre | 151/43 |
| 3,051,519 | 8/1962 | Sudeikis | 403/43 |
| 3,997,945 | 12/1976 | Robins | 24/129 R |

*Primary Examiner*—John A. Pekar
*Attorney, Agent, or Firm*—William R. Laney

[57] ABSTRACT

A tensioning linkage which includes a pair of flexible elements each having an end secured to threaded elements which are threaded into opposite ends of a turnbuckle sleeve. The turnbuckle sleeve carries a weight which opposes rotation of the turnbuckle sleeve about its longitudinal axis in a direction of rotation which causes the threaded elements to unthread in the sleeve. Each of the flexible elements carries an attachment plate at its end opposite the end to which the threaded element is secured.

5 Claims, 2 Drawing Figures

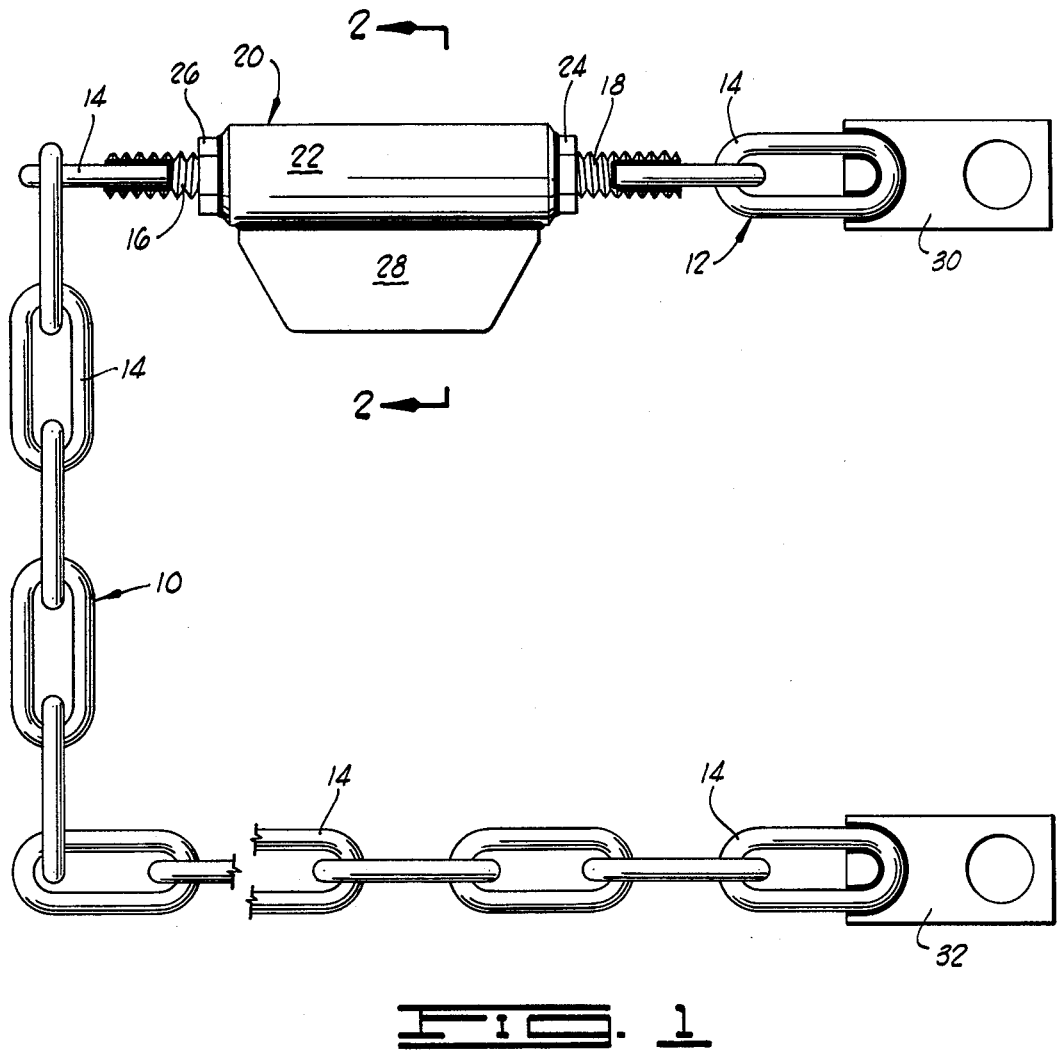
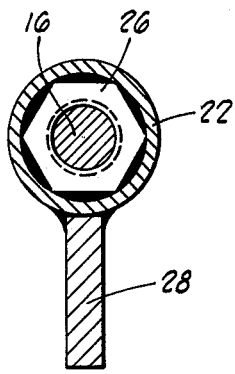

TENSIONING LINKAGE

BACKGROUND OF THE INVENTION

1. Field of the Invention

This invention relates to stabilizing elements and tensioning linkages of a sort used in agricultural implements, although the invention is not limited to such usage.

2. Brief Description of the Prior Art

In the use of agricultural tractors, two types of stabilizing linkages have frequently been used in the three-point hitch connection for the purpose of stabilizing an implement connected to, and towed behind, the tractor. One of these types of stabilizing elements is an elongated rigid bar having holes in its opposite ends. Two of such stabilizing bars are connected at opposite sides of the central hitch link in the tractor and function to prevent swaying of the agricultural implement from side to side, or canting of the implement as it is towed behind the tractor.

The rigid bar type stabilizing elements, as used for stabilizing the movements of an implement towed behind an agricultural tractor, present some difficulty in usage, since it is always necessary to shift the equipment between which the stabilizing bars are connected by a sufficient amount that the holes provided at opposite ends of the bars for effecting connection are lined up with the appropriate interlocking studs provided on the implement and on the tractor. At times procuring such alignment is a strenuous and frustrating task.

In another type of stabilizing device which has been used in the hook-up between towed implements and agricultural tractors, elongated flexible tensioning linkages or stabilizing members have been used at the same locations where the rigid stabilizer bars described above have been used. In these flexible tensioning linkages, a turnbuckle sleeve is generally interposed between flexible members, such as a pair of chains, with the chains being drawn tight after their ends are connected at the implement and tractor so as to tension the linkage between the points of connection. This is effected by rotating the turnbuckle sleeve until the desired degree of tensioning is attained. Usually this is accomplished manually. The tensioning of the flexible tensioning linkages, which are horizontally spaced from each other and connected to opposite sides of the towed implement, when functioning conjunctively with the three-point linkage provided for hooking up the implement, acts to stabilize the implement, and to prevent it from swaying from side to side.

The flexible tensioning linkages used for stabilization in the manner described provide an advantage over rigid stabilizer bars, in that there is no difficulty in connecting the opposite ends of the linkages to the provided points of connection on the implement and on the tractor. In general, such flexible linkages can be much more quickly and easily installed than can the rigid stabilizer bars. On the other hand, difficulty has been experienced in maintaining the tension in the flexible tensioning linkages after this has been set by manual adjustment. Loss of tension in the tensioning linkages occurs as a result of the turnbuckle sleeves undergoing an unthreading rotation as vibrational forces are transmitted to the sleeve through the chain sections which it interconnects. In order to prevent such reverse rotation of the turnbuckle sleeve having the effect of relieving the tension in the tensioning linkages, a pair of locking nuts have generally been provided on the threaded members carried by the chain sections and threaded into the turnbuckle linkage. These locking nuts are manually threaded up against the opposite ends of the turnbuckle sleeve so that the sleeve, by frictional contact with the nuts, is prevented from undergoing undesirable rotation under the influence of vibrational stresses. It has frequently been difficult and occasionally impossible, however, to sufficiently manually tighten the locking nuts against the turnbuckle sleeve to prevent the nuts from working loose enough to permit the sleeve to undergo unthreading rotation over extended periods of usage of the tractor and implement.

GENERAL DESCRIPTION OF THE PRESENT INVENTION

The present invention constitutes an improved tensioning linkage which can be extended between two structural elements and placed in tension by manual manipulation. The tensioning of the linkage involves the use of a manually rotatable turnbuckle sleeve, which sleeve is constructed so that once the linkage is placed in tension, the sleeve will not undergo loosening by vibration so as to relieve the tension in the linkage.

Broadly described, the tensioning linkage of the invention includes a pair of elongated flexible elements each having an end secured to a threaded element. The two threaded elements at ends of the flexible elements are threaded into the opposite ends of an internally threaded turnbuckle sleeve. The pitch of the threads is such that rotation of the sleeve in one direction will cause both the threaded elements to be threaded inwardly into the sleeve, and rotation of the sleeve in the opposite direction will cause both of the elements to be threaded out of the turnbuckle sleeve.

The turnbuckle sleeve carries an external, eccentrically positioned weight plate which, in a preferred embodiment of the invention, is shaped to function dually as a handle facilitating the rotation of the turnbuckle sleeve. At their ends opposite the ends which are connected to the threaded elements, the flexible elements preferably each carry an apertured plate or other means facilitating securement of the outer ends of the flexible elements to structural members between which the tensioning linkage is to be extended.

An important object of the present invention is to provide a tensioning linkage which can be manually placed in tension by means of a turnbuckle sleeve, which tensioning linkage will not undergo loosening as a result of vibration transmitted to the turnbuckle sleeve.

A further object of the invention is to provide a tensioning linkage which is mechanically simple, can be easily operated and which automatically locks against vibrational loosening after it is placed in position.

Additional objects and advantages will become apparent as the following detailed description of a preferred embodiment of the invention is read in conjunction with the accompanying drawings which illustrate such preferred embodiment.

GENERAL DESCRIPTION OF THE DRAWINGS

FIG. 1 is a side elevation view of a tensioning linkage constructed in accordance with the present invention.

FIG. 2 is a sectional view taken along line 2—2 of FIG. 1.

DETAILED DESCRIPTION OF A PREFERRED EMBODIMENT OF THE INVENTION

The tensioning linkage of the invention includes a plurality of elongated flexible elements designated generally by reference numerals 10 and 12 in FIG. 1 of the drawings. In the form of the invention illustrated, the flexible element 10 includes a plurality of chain links 14, and is considerably longer than the flexible element 12, which also includes a pair of chain links 14. The chain link 14 at one end of the flexible element 10 is welded or otherwise suitably secured to an externally threaded shaft or stud 16. The chain link 14 at one end of the flexible element 12 is similarly welded or otherwise suitably secured to an externally threaded shaft or stud 18.

The threaded shafts 16 and 18 are threaded into the opposite ends of a turnbuckle sleeve designated generally by reference numeral 20. The turnbuckle sleeve 20 includes an elongated central cylindrical or tubular member 22 which has a pair of internally threaded nuts 24 and 26 welded to its opposite ends, with the opening through these nuts in alignment with the bore through the center of the tubular member 22. The threaded nuts 24 and 26 function to threadedly receive the threaded shafts 16 and 18, and the arrangement of the threads of the nuts and shafts is such that as the turnbuckle sleeve 20 is rotated in one direction, each of the threaded shafts 16 and 18 will be threaded into the tubular member 22 via the threaded nuts 24 and 26. When the turnbuckle sleeve is rotated in the opposite direction, each of the threaded shafts 16 and 18 will be backed out of the tubular member by unthreading from the nuts 24 and 26.

The tubular member 22 has secured along its length, and on one side thereof, a weight plate 28. In the illustrated embodiment of the invention, the weight plate 28 is a flat, generally trapezoidally shaped plate made of iron or steel and is of sufficient thickness (see FIG. 2) and mass to provide a significant downwardly acting force as the weight plate responds to gravity.

At the opposite end of the flexible element 12 from the end thereof connected to the threaded shaft 18 is an apertured securement plate 30 which can be welded or otherwise suitably secured to one of the chain links 14. Similarly, an apertured securement plate 32 is welded or otherwise suitably secured to the chain link 14 which is at the opposite end of the flexible element 10 from the end which is connected to the threaded shaft 16.

In utilizing the tensioning linkage of the invention, the securement plates 30 and 32 are connected to two spaced mechanical elements between which it is desired to extend the tensioning linkage in order to exert a force tending to draw or pull one toward the other. After the securement elements 30 and 32 are secured to these mechanical members, the linkage is placed in tension by manually rotating the turnbuckle sleeve 20 in a direction such that the threaded shafts 16 and 18 are threaded into the tubular member 22 via the threaded nuts 24 and 26. This action will, of course, draw the linkage tight and place it in tension. Some leverage to assist in the manual tensioning of the tensioning linkage in this respect is afforded by the position and shape of the weight plate 28.

After the tensioning linkage has been tensioned in the manner described, the weight plate 28 is turned to a position where it extends downwardly from the tubular member 22. Gravity tends to retain the weight plate 28 in this position. Thus, as the tensioning linkage is subjected to vibration during the operation of the machinery in which it is located, such as a farm tractor, the normal tendency of the tubular member 22 of the turnbuckle sleeve 20 to undergo rotation during such vibration is resisted by the gravitational force tending to retain the weight plate 28 in a downwardly extending position. Thus, despite many hours of operation under mechanically stressing conditions which result in the creation and transmission of substantial vibratory forces to the turnbuckle linkage, it does not rotate in such manner as to cause the threaded shafts 16 and 18 to undergo unthreading from the threaded nuts 24 and 26, with consequent slacking or relieving of the tension in the tensioning linkage.

It will be perceived that the tensioning linkage of the invention has obviated or eliminated the necessity to provide lock nuts on the threaded shafts 16 and 18, as is the customary and normal practice, for the purpose of undertaking to lock the turnbuckle sleeve 20 against loosening rotation. The locking of this sleeve is automatic, and even if the turnbuckle sleeve should not be ultimately positioned, during tensioning of the linkage, so that the weight plate 28 depends directly downwardly, the pull of gravity on this plate will still resist rotation of the sleeve in a direction to loosen the linkage, provided only that the plate is on that side of the tubular member 22 where its downward movement is in the opposite direction from the direction in which it would move during an unthreading rotational movement of the turnbuckle sleeve.

Although a preferred embodiment of the invention has been herein described in order to illustrate the principles of the invention, it will be understood that various changes of form and dimension can be effected without departure from such basic principles. Thus, the types of flexible elements disposed on opposite sides of the turnbuckle sleeve can be varied, as can their length. Moreover, different devices can be used for connecting the outer ends of the flexible elements to the mechanical structures between which the tensioning linkage is to be extended. Changes and innovations of this type, in continuing to rely upon the basic principles of the invention, are deemed to be circumscribed by the spirit and scope of the invention, except as the same may be necessarily limited by the appended claims or reasonable equivalents thereof.

What is claimed is:

1. A tensioning linkage comprising:
    a pair of elongated flexible elements;
    a turnbuckle sleeve;
    means threadedly connecting an end of each of said flexible elements to an end of said turnbuckle sleeve; and
    a weight connected to said turnbuckle sleeve and projecting from one side thereof for opposing rotation of the turnbuckle sleeve about its longitudinal axis in a direction which causes the flexible elements to unthread from the sleeve;
    wherein said weight is a trapezoidally shaped plate projecting from said sleeve in a plane containing said longitudinal axis and facilitating manual rotation of said sleeve about said longitudinal axis.

2. A tensioning linkage as defined in claim 1 wherein each of said flexible elements is a chain.

3. A tensioning linkage as defined in claim 2 and further characterized as including apertured securement plates secured to the opposite ends of each of said flexible elements from the ends thereof threadedly connected to said turnbuckle sleeve.

4. A tensioning linkage as defined in claim 3 wherein said connecting means comprises:
   internally threaded nuts secured to opposite sides of the turnbuckle sleeve; and
   externally threaded shafts secured to said first-mentioned end of each of said flexible elements.

5. A tensioning linkage comprising:
   a pair of elongated flexible elements;
   a turnbuckle sleeve;
   means threadedly connecting an end of each of said flexible elements to an end of said turnbuckle sleeve; and
   a weight connected to said turnbuckle sleeve and projecting from one side thereof for opposing rotation of the turnbuckle sleeve about its longitudinal axis in a direction which causes the flexible elements to unthread from the sleeve, said weight projecting from said sleeve sufficiently far to constitute a handle and facilitate manual rotation of said sleeve about said longitudinal axis.

* * * * *